(12) United States Patent
Fuchs

(10) Patent No.: US 7,284,665 B2
(45) Date of Patent: Oct. 23, 2007

(54) METHOD AND APPARATUS FOR PROCESSING ARTICLES

(75) Inventor: Milan Fuchs, Winchester (GB)

(73) Assignee: Radix System Limited (GB)

( * ) Notice: Subject to any disclaimer, the term of this patent is extended or adjusted under 35 U.S.C. 154(b) by 653 days.

(21) Appl. No.: 10/763,927

(22) Filed: Jan. 23, 2004

(65) Prior Publication Data

US 2004/0168584 A1    Sep. 2, 2004

(30) Foreign Application Priority Data

Jan. 24, 2003    (GB) ................................ 0301687.0
Jun. 2, 2003    (GB) ................................ 0312633.1

(51) Int. Cl.
*B07B 1/22* (2006.01)

(52) U.S. Cl. ................ 209/270; 209/44.3; 209/294; 209/644

(58) Field of Classification Search ............... 209/44.2, 209/44.3, 268, 270, 284, 288, 294, 295, 250, 209/552, 644, 576, 587
See application file for complete search history.

(56) References Cited

U.S. PATENT DOCUMENTS

| | | | | |
|---|---|---|---|---|
| 3,633,743 A | * | 1/1972 | Gooding et al. | ............ 209/250 |
| 4,236,541 A | * | 12/1980 | Cipriani | ................... 134/104.3 |
| 4,720,473 A | * | 1/1988 | Welch et al. | ................. 502/21 |
| 5,894,936 A | * | 4/1999 | Sanders et al. | ............. 209/270 |

\* cited by examiner

*Primary Examiner*—Joseph C. Rodriguez
(74) *Attorney, Agent, or Firm*—Michael Y. Epstein

(57) ABSTRACT

Apparatus is described for processing articles. It has a hollow drum having permeable walls. At one end there is an inlet for receiving articles onto an inside surface of the permeable walls. At the other end is an outlet for discharging articles from the drum. The drum is rotated about an axis having at least a horizontal component at such speed that centrifugal force acting on the articles is sufficient to overcome the gravity acting on the articles. A first jet of fluid is applied to the articles through the permeable wall, to displace the articles from the inside surface and in a direction away from the inlet, towards the outlet. In one application, the process is used to dry the articles. In another application the process is used to inspect the articles.

9 Claims, 4 Drawing Sheets

METHOD AND APPARATUS FOR PROCESSING ARTICLES

BACKGROUND OF INVENTION

This invention relates to a method and apparatus for processing articles.

The background to the invention will be explained with respect to particular applications. The invention is not limited to these, however, and other applications may occur readily to the reader.

Some articles are spun to dry them, e.g. after washing. Examples are "prepared" leaf vegetables e.g. green salad vegetables. Conventionally, they are loaded into a "spin dryer" drum in batches, spun dry and then the batch is emptied from the drum. It would be advantageous to use a continuous process instead of a batch process.

SUMMARY OF INVENTION

Against this background, the invention provides apparatus for processing articles, comprising a hollow drum having permeable walls, at one end an inlet for receiving articles onto an inside surface of the permeable walls; at the other end an outlet for discharging articles from the drum; means for rotating the drum about an axis having at least a horizontal component at such speed that centrifugal force acting on the articles is sufficient to overcome the gravity acting on the articles, and progressing means for applying a first jet of fluid to the articles through the permeable wall, to displace the articles from the inside surface and in a direction away from the inlet, towards the outlet.

In one application, the process is used to dry the articles. The speed of rotation of the drum may be chosen to suit the degree of drying required, and the displacement of the article by the jet of fluid may turn the article so that liquid which might otherwise lie trapped on an inward side of the article lying towards the center of the drum, is repositioned outwardly away from the center of the drum.

In another application the process is used to inspect the articles. In the preparation of leaf "prepared" vegetables, e.g. salads, spinach etc, the vegetables are inspected for blemishes and the presence of pests, e.g. caterpillars, slugs and insects. Inspection is difficult, for example leaves tend to stick together, pests tend to hide in folds in the leaves, and turning the leaves to view all surfaces is difficult and onerous. Inspection is carried out manually. Operatives turn and inspect the product as it passes on a moving belt. There are a small but significant number of blemishes and pests missed.

Whilst it is not envisaged that such problems can be totally eliminated, as the jet progresses the article, it is likely to turn it over. Most preferably, one or more first jets are sufficient to give a very high chance of the articles being turned in passage through the drum thus enabling all faces of the articles to be inspected.

In this application, the apparatus preferably includes rejection means for selectively applying a second jet of fluid to project rejected articles into means for removing rejected articles from the drum.

Dependent on the characteristics of the articles and the material of the drum, the articles can be inspected from inside or outside the drum. Preferred apparatus includes inspection means directed at the outside surface of the permeable wall, and control means responsive to the output from camera to reject articles according to predetermined criteria and to operate said rejection means to apply said second jet of fluid selectively to remove the rejected articles.

The rejection means is preferably operable to apply a plurality of second jets individually selectable, and wherein the control means is operative to analyse output from the inspection means to select one or more second jets.

The inspection means is a preferably line scan camera, used in conjunction with illumination means to detect reflected light.

In order to ensure an article is conveyed round the drum between successive visits to a or the first jet this is arranged to displace articles in a direction having a component normal to and towards the axis of the drum and a component parallel to the axis and towards the outlet of the drum.

The invention also extends to a method for processing articles, comprising conveying the articles through an inlet and onto an inside surface of permeable walls of a hollow drum; rotating the drum about an axis having at least a horizontal component at such speed that centrifugal force acting on the articles is sufficient to overcome the force of gravity acting on the articles, and applying a first jet of fluid to the articles through the permeable wall, to displace the articles from the inside surface and in a direction away from the inlet.

BRIEF DESCRIPTION OF THE DRAWINGS

One embodiment of the invention will now be described, by way of example, with reference to the accompanying drawings, in which.

DETAILED DESCRIPTION OF THE INVENTION

Figure 1:
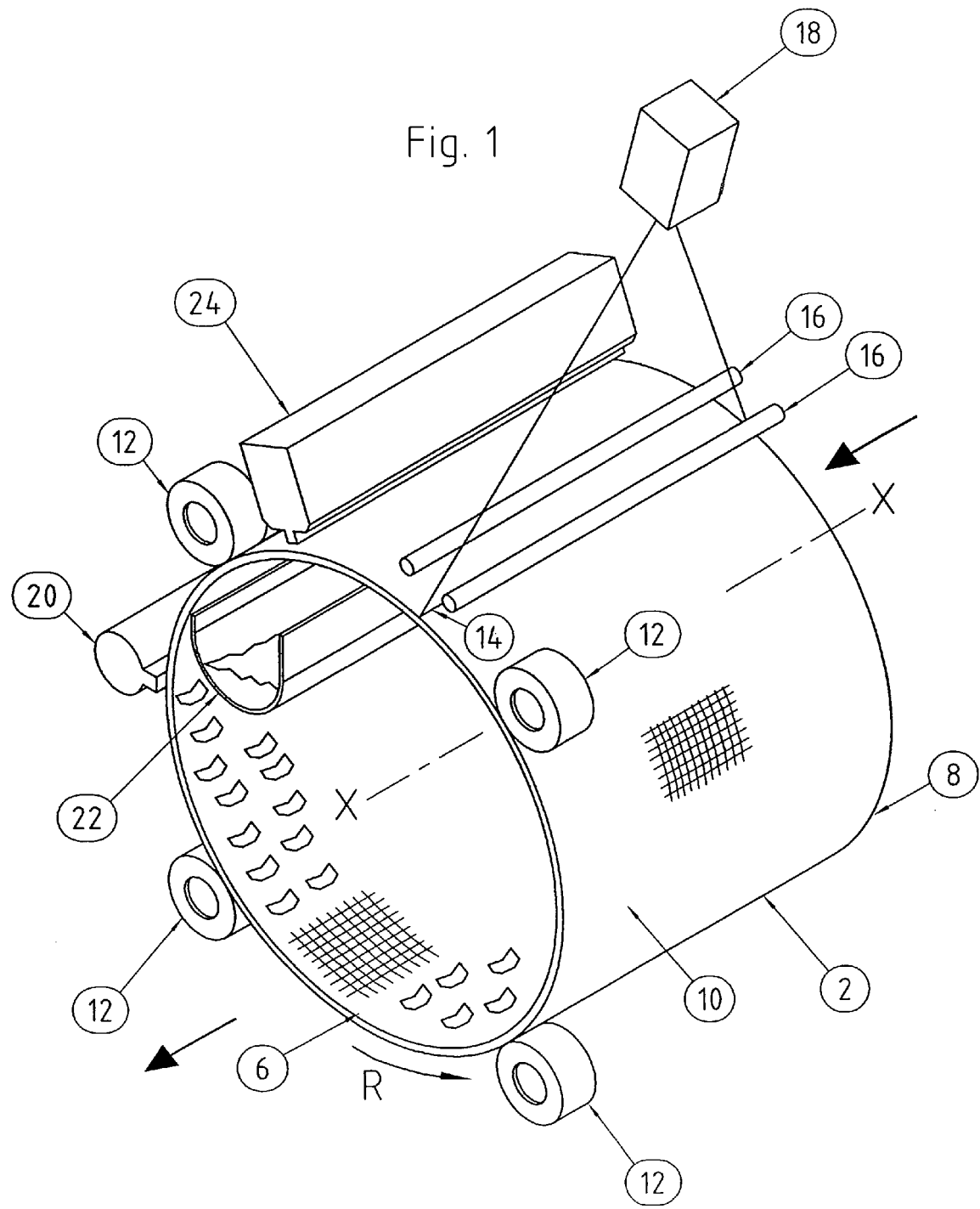
FIG. 1 is a schematic pictorial view of inspection apparatus embodying the invention.
Figure 2:
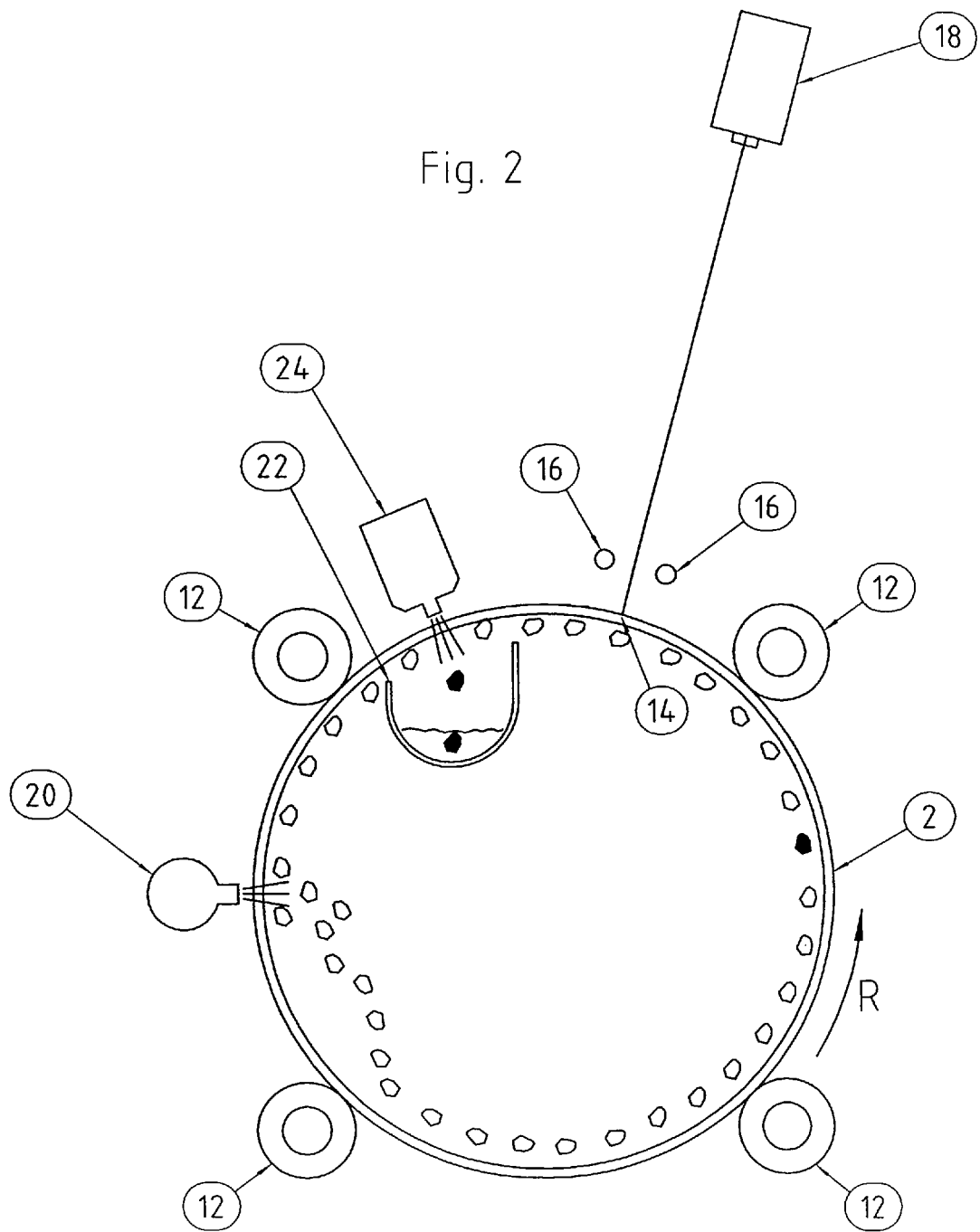
FIG. 2 is an end view of the apparatus of FIG. 1.

Referring to the drawings, a hollow drum 2 has open ends 6 and 8 and permeable walls 10. The walls may, for example be a perforate sheet material or mesh. The drum 2 is supported at each end by four rollers 12 (shown only at one end in the drawings) at least one of which is driven so as to rotate the drum about an axis X-X which is or has at least a component which is horizontal. Generally the axis will be horizontal. The drum is driven at such a speed that articles, e.g. leaf vegetables, introduced at the end 8, constituting an inlet, and falling onto the inside surface of the walls 10 are, unless rejected, carried in a complete revolution round the drum as it rotates. That is the centrifugal force on the leaves is sufficient to overcome the force of gravity.

As the leaves pass an inspection line 14, they are illuminated by light sources 16. The inspection line 14 is viewed by a line scan camera 18 which provides a pixel by pixel output to control means (not shown) which is operative to compare the output with predetermined criteria to determine whether an article is acceptable or should be rejected, e.g. to identify a blemish or pest on a leaf. The criteria may be based on color or other physical or biological properties of the product under inspection.

A conveyor or flume 22 extends inside the length of the drum at such a position that articles pass it subsequent to passing the line of inspection 14. If the control means (not illustrated) determines that an article should be rejected it is projected into the conveyor or flume to be transported out of the drum into a receptacle for rejected articles (not shown).

For this purpose a rejection bar 24 containing a plurality of fluid e.g. air jets, not illustrated individually, but individually selectable, is positioned outside the drum directed inwardly towards the conveyor or flume. The control means (not illustrated) is arranged to select one or more of the bar 24 jets to operate at a suitable time after the detection of a reject article, to propel the article into the conveyor or flume 22.

As or if the revolving leaf moves on from the rejection bar 24 and conveyor or flume 22 it passes a jet bar 20. This is approximately parallel to the axis X-X and contains a plurality of fluid, e.g. air jets directed to have a component parallel to the axis X-X and a component in the direction of rotation R, that is normal to the axis X-X. The jets propel the leaves off the drum, against the force of gravity and the centrifugal force, and project it away from the inlet towards the outlet and a little round the drum in the direction of rotation so that when it falls by force of the air jet and of gravity it completes remainder of another revolution, this time nearer the outlet, past the line of inspection 14 unless rejected. The action of the jets in the jet bar 20 is intended also to turn the article over. The drum 2 and the jet bar 20 are sufficiently long that in passage from one end 8 of the drum to the other 6, there is a high probability that an article will be turned over sufficiently for all its surfaces to be inspected and/or dried. The direction and force of each jet can be tailored to a particular product and individually selected to increase this probability.

The walls 10 are transparent perforate material, so that the articles on the inspection line 14 can be inspected from outside the drum. Transparency may be provided by the material and/or the construction of the drum, e.g. by an open mesh or large perforations.

If the physical attributes (e.g. size) of the articles, or the material, or the construction of walls 10 do not allow for the inspection from the outside of the drum, it would be possible to inspect the articles on the inspection line 14 from the inside of the drum 2 but some of the components will require alternative positioning.

Figure 3A:
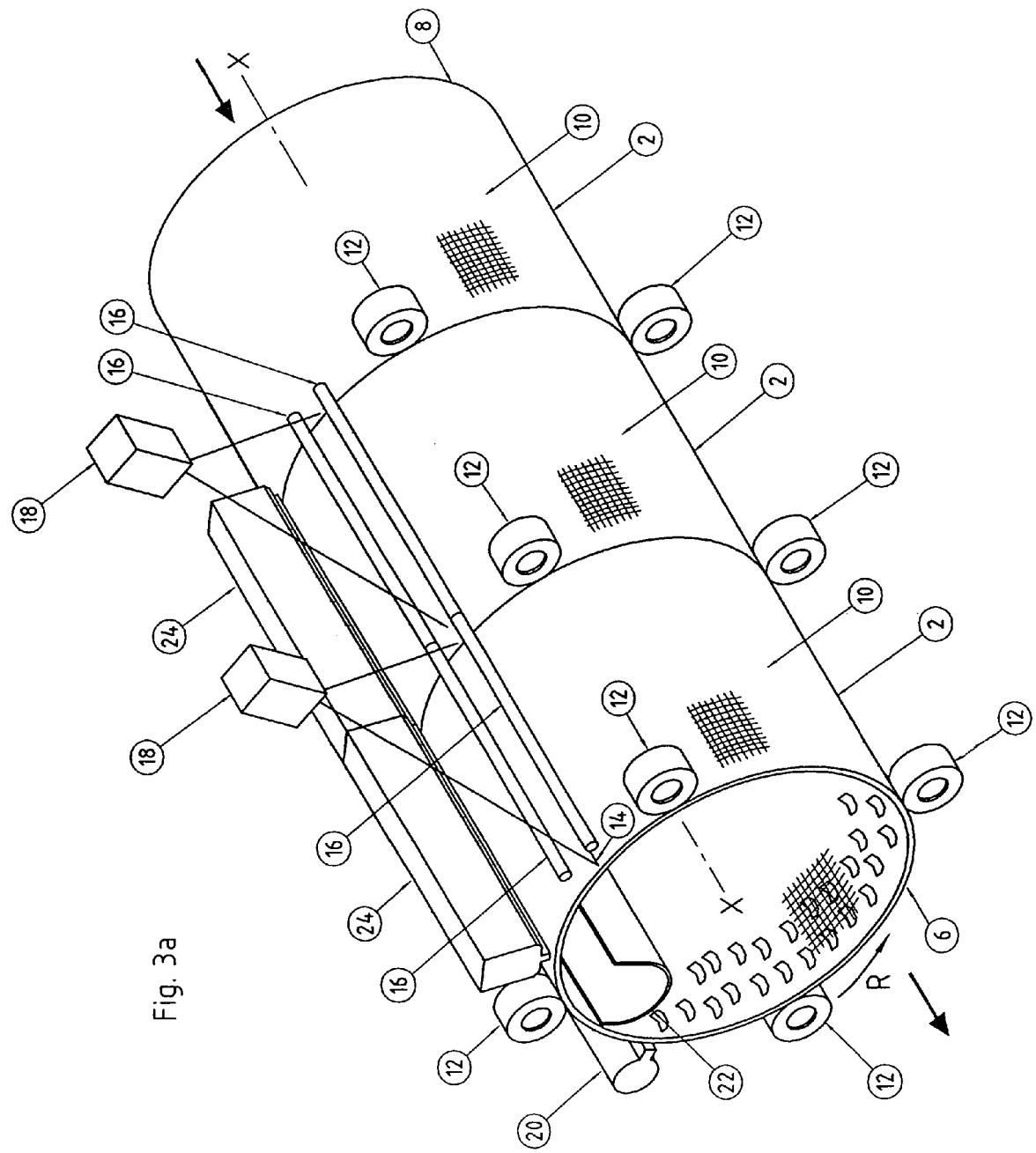
FIGS. 3a and 3b show two views of a combined drying and two-stage inspection apparatus.
Figure 3B:
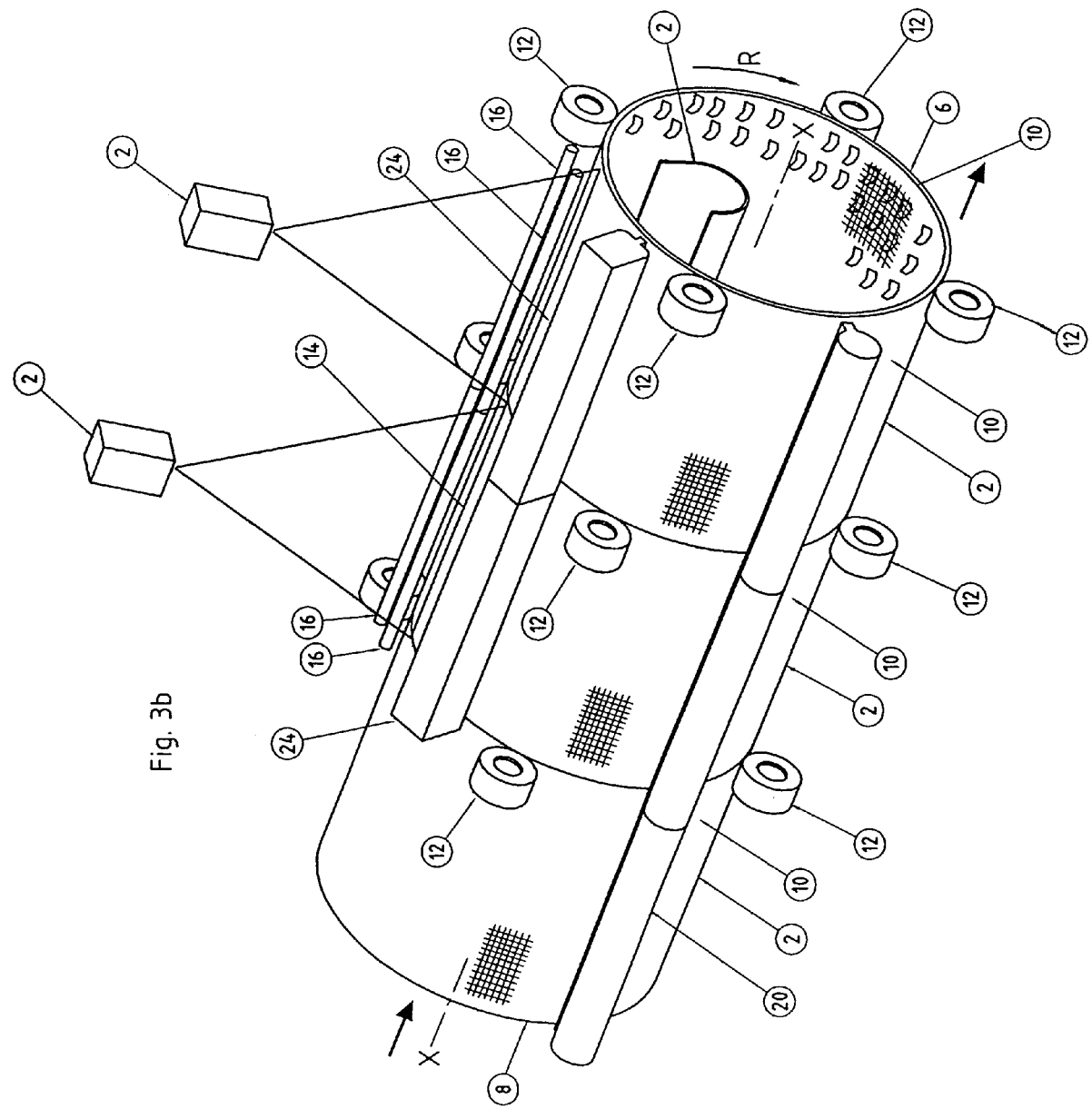

In FIGS. 3a and 3b, three drums 10 are placed end to end, so that the articles pass from one to another. Only one of the drums is provided with inspection and rejection apparatus. The others are used to dry the articles by a combination of centrifugal force and air drying. The order in which a number of the drums 10 are arranged will probably be that illustrated, so that articles are dried first then inspected. The drying drums may rotate faster than the inspecting drum.

The invention claimed is:

1. Apparatus for processing articles, comprising a hollow drum having permeable walls, at one end an inlet for receiving articles onto an inside surface of the permeable walls;
   at the other end an outlet for discharging articles from the drum;
   means for rotating the drum about an axis having at least a horizontal component at such speed that centrifugal force acting on the articles is sufficient to overcome the gravity acting on the articles, and progressing means for applying a first jet of fluid to the articles through the permeable wall, to displace the articles from the inside surface and in a direction away from the inlet towards the outlet, the apparatus further including rejection means for selectively applying a second jet of fluid to project rejected articles into means for removing rejected articles from the drum;
   inspection means directed at a surface of the permeable wall, and control means responsive to output from said inspection means to reject articles according to predetermined criteria and to operate said rejection means to apply said second jet of fluid selectively to remove the rejected articles.

2. Apparatus as claimed in claim 1, wherein the rejection means is operable to apply a plurality of second jets selectively, and wherein the control means is operative to analyze output from the inspection means to select one or more second jets.

3. Apparatus as claimed in claim 2, wherein the inspection means is a line scan camera.

4. Apparatus as claimed in claim 1, wherein the first jet is arranged to displace articles in a direction having a component normal to and towards the axis of the drum and a component parallel to the axis and towards the outlet of the drum.

5. A plurality of apparatus as claimed in claim 1 arranged in sequence so that the outlet of one drum acts as an inlet to the next one.

6. Apparatus as claimed in claim 1, wherein said inspection means is directed at an inside surface of said wall.

7. Apparatus as claimed in claim 1, wherein said inspection means is directed at an outside surface of said wall.

8. A method for processing articles, comprising:
   conveying the articles through an inlet and onto an inside surface of permeable walls of a hollow drum;
   rotating the drum about an axis having at least a horizontal component at such speed that centrifugal force acting on the articles is sufficient to overcome the gravity acting on the articles;
   applying a first jet of fluid to the articles through the permeable wall, to displace the articles from the inside surface and in a direction away from the inlet, including selectively applying a second jet of fluid to project rejected articles into means for removing rejected articles from the drum;
   inspecting articles and rejecting articles according to predetermined criteria, and applying said second jet of fluid selectively to remove the rejected articles.

9. A method as claimed in claim 8, including analyzing output from a camera used to inspect said articles to select one or more second jets.

* * * * *